Patented Apr. 21, 1931

1,801,704

UNITED STATES PATENT OFFICE

SIDNEY DEEDS WELLS, OF QUINCY, ILLINOIS, ASSIGNOR TO PAPER MILL LABORATORIES, INC., OF QUINCY, ILLINOIS, A CORPORATION OF ILLINOIS

MATERIAL FOR FOODSTUFF CONTAINERS AND PROCESS OF PREPARING THE SAME

No Drawing.   Application filed April 8, 1929. Serial No. 353,665.

This invention relates to containers for packaging foodstuffs and to a process for preparing the material of the containers.

The improvement involves as a new product an odorless sterilized and disinfected strawboard suitable for egg crate fillers and which strawboard will remain odorless and sterile under cold storage conditions. Thus the invention provides a product combining the natural stiffness of strawboard with freedom from objectionable odor, heretofore characteristic of strawboard when under cold storage conditions.

In the production of fillers for cases for the shipment and storage of eggs, strawboard made from straw pulped by digestion with hydrates of alkaline earths is almost exclusively used. Undesirable tendencies occur in this material under storage conditions in which the humidity of the air is often from 80° to 90° and the strawboard fillers develop an odor suggestive of musty straw, and to which odor must be blamed some of the so-called cold storage taste in eggs. Studies of strawboard fillers have shown that even under the most careful conditions of manufacture, approximately one-half of the lime used in cooking remains present in the board. As the board becomes damp in cold storage, the lime residues react and the characteristic odor is produced. The present invention is offered as an improvement by which the undesirable odors are avoided.

In my co-pending application for patent Serial No. 128,714, filed August 11, 1926, which in turn is a continuation in part of my application Serial No. 38,354, filed June 19, 1925, there has been described and claimed a new product, namely, an odorless strawboard for packaging foodstuffs, and which was prepared by the digestion of straw with chemical agents capable of producing water soluble products with the incrusting matter dissolved from the straw. This present invention is directed to a somewhat related procedure and improved product. The distinctive features in this present invention involve particularly the use of a disinfectant, such as chlorine, added to a previously sterilized and disinfected straw and by the use of which chlorine as a disinfectant the subsequent product is enabled to remain sterile. Thus there is produced an odorless strawboard which is capable of remaining odorless under cold storage conditions and which is characterized by the property of remaining sterile under conditions which without the use of a disinfectant might tend to the development of bacteria.

In conducting this process to produce the desired sterilized and disinfected strawboard material, the following steps may be taken. The fibrous vegetable material, for example, fresh, clean wheat straw, is charged into a boiler or digester after having been cut or shredded if desirable. The charge of aqueous cooking solution of the type specified in my application for patent Serial 128,714, such as a mixture of sodium carbonate and sodium sulphite, amounting to 7 per cent of the weight of the straw, is added, and the contents heated by means of the application of steam applied either indirectly to the exterior, or directly into the contents of the cooking container, or a combination of these two methods. After steaming sufficiently the digester is relieved of pressure by opening a valve, whereupon the hot air, carbon dioxide and steam is allowed to escape. More straw may be added and the operation repeated. When the full charge of straw has been added in successive batches, the final heating is performed. Air and other gases are allowed to escape from time to time until the excess pressure over the steam pressure for the temperature indicated is as low as is practical. When a temperature of 260° F. is obtained, the cooking is usually completed at the end of about eight hours. The steam in the vessel is then relieved and the contents emptied and beaten, pounded or rubbed, either before or after washing. The resulting cooked material has thus been completely sterilized.

The sterilized pulp material thus obtained in accordance with the above described treatment is now further disinfected and treated to insure that it remains sterile by adding chlorine. This addition of the disinfectant may satisfactorily be effected while the pulp is in dilute aqueous solution, as for example just prior to the production of the strawboard or paper. For instance, the pulp may be treated with chlorine just as the pulp enters the vat at the wet end of the paper machine. The paper stock entering at this point is very dilute, usually about one part of fibrous material to about five hundred parts of water. Most of this water is, of course, removed while the sheet is being formed. This water is not wasted, but the major portion of it is recovered and used to mix with the pulp on its way to the paper machine. In this way the greater portion of the water used is in a closed system, and it circulates from the machine to a pump and back to the machine again. The chlorine gas may be added to this circulating water in which it may be readily dissolved. From $\frac{1}{10}$ of 1% to 5% of chlorine compared to the weight of the pulp may be used. In other words, the concentration of chlorine in the water need not exceed 1%. At this dilution the chlorine gas is not detected as escaping into the atmosphere, and the operation is consequently safe for the workmen.

After the strawboard material has been sterilized in the cooking treatment and subsequently disinfected by the use of chlorine, and thus insured of remaining sterile, the pulp thus prepared may be made into strawboard by the use of any satisfactory machinery. Such subsequent shaping of the strawboard pulp into any particular form or configuration is not a part of the present invention. The resultant strawboard pulp may be formed into any of the usual articles, but it is particularly important as the material of foodstuff containers, such as egg cases and egg case fillers, partitions and spacers, where the absence of odor forming materials enables the pulp product to render efficient service.

From the foregoing it will be clear that this invention provides a new product and a new process for preparing this product. The product is a strawboard material sterilized and disinfected and capable of remaining sterile because of the portion of chlorine incorporated with the pulp.

The pulping materials used for digesting the straw do not constitute of themselves a part of this present invention, but are described in application 128,714, in which application it is pointed out that in lieu of a mixture of sodium carbonate and sodium sulphite, other materials may be used, such as sodium carbonate with sodium sulphide or sodium hydroxide, or other water soluble compounds of alkaline or reducing nature, or suitable combinations of the same, to give the required alkalinity and solvent action, and further that such combinations as calcium hydroxide and sodium sulphate may be used and which dissolve the incrusting matter of the straw into water soluble compounds and form relatively insoluble substances such as calcium sulphate which is odorless, tasteless, inert and otherwise unobjectionable and a valuable filling agent.

In lieu of the sodium sulphite and sodium carbonate cooking solution mentioned hereinbefore as the agent for pulping and producing an initially sterilized pulp, I have used to advantage with the subsequent chlorine treatment a cooking solution of lime, and have discovered that lime cooked straw pulp when subsequently treated with chlorine as a disinfectant, lost the usual tendency of such lime made pulp to give off the characteristic strawboard odor under cold storage conditions. Chlorine treated lime made pulp is thus a disinfected and sterile pulp. It has proved highly satisfactory for the material of food containers.

In lieu of chlorine, I have used copperas satisfactorily. Other suitable disinfectants are sodium fluoride, also calcium fluoride, also calcium fluo-silicate.

The application of a sterilizing solution to strawboard or paper board suitable for egg crate fillers may be effected by treating the board after it has been formed on the paper machine and has left the driers. Such a solution may be an aqueous preparation of sodium fluoride. In actual practice, this treatment is preferably given at the water boxes on the calendars. Instead of supplying water boxes with water, as in the practice of making water finished products, I substitute a solution of sodium fluoride of a concentration of about three grams per liter. The paper board coming in contact with this solution as it passes through the calendars takes on enough to render its surface sterilized and capable of resisting the action of organisms which tend to cause decomposition and disagreeable odors.

In accordance with an alternate procedure, there may be used an insoluble disinfectant such as calcium fluo-silicate, which may be mixed with pulp in the beaters and a sufficient quantity will be retained by the fiber in the subsequent production of the board on the paper machine to render it resistant to the organisms of decomposition. Suspensions of calcium fluo-silicate can also be added to the board at the water boxes on the calendars in the manner described above for the use of sodium fluoride.

In the foregoing description and in the claims where reference is made to straw board, it will be understood that this includes also paper or paper board made from any fibrous material, as, for example, from old paper, ground wood pulp, sulphite pulp, etc.

I claim:

1. Strawboard comprising disintegrated new straw sterilized and disinfected, the strawboard being odorless and sterile.

2. As a new product suitable for the packaging of foodstuffs, odorless and sterile strawboard pulp comprising new straw disintegrated, steam cooked and disinfected and capable of remaining odorless under cold storage conditions.

3. As a new product suitable for the packaging of foodstuffs, odorless and sterile strawboard pulp comprising new straw disintegrated, steam cooked and disinfected and containing chlorine in amount sufficient to destroy fungi and bacteria, said pulp being capable of remaining odorless under cold storage conditions.

4. The process of manufacturing odorless strawboard for the packaging of foodstuffs which process comprises preparing straw pulp by cooking fresh straw with a chemical agent and in the presence of steam whereby the material is sterilized, and subsequently treating the sterilized straw pulp with chlorine in amount sufficient to disinfect it and to insure its continued sterility, said sterilized straw pulp being capable of remaining odorless under cold storage conditions.

5. The process of manufacturing odorless strawboard for the packaging of foodstuffs which process comprises preparing straw pulp by cooking fresh straw with a chemical agent and in the presence of steam whereby the material is sterilized, and subsequently treating the sterilized straw pulp while in aqueous solution with chlorine gas in amount of about one per cent of gas to one hundred per cent of pulp, thus sufficient to disinfect it and insure its continued sterility, said pulp being capable of remaining odorless under cold storage conditions.

6. As a new product, suitable for the packaging of food stuffs, odorless and sterile fiber board including fibrous material disintegrated, disinfected and shaped into sheet form and capable of remaining odorless under cold storage conditions.

7. As a new product, suitable for the packaging of food stuffs, fibrous pulp comprising fibrous material disintegrated, steam cooked and disinfected and capable of remaining odorless under cold storage conditions.

8. As a new product, suitable for the packaging of food stuffs, fiber board comprising fibrous material sterilized and disinfected, the fiber board being odorless and sterile and capable of remaining odorless under cold storage conditions.

In testimony whereof I affix my signature.

SIDNEY D. WELLS.